(12) United States Patent
Torashima et al.

(10) Patent No.: US 7,196,830 B2
(45) Date of Patent: Mar. 27, 2007

(54) OPTICAL DEFLECTOR HAVING NEUTRAL SURFACE OF BENDING IN MOVABLE MEMBER IN DIFFERENT PLANE FROM NEUTRAL SURFACE OF BENDING IN ELASTIC SUPPORT MEMBER

(75) Inventors: Kazutoshi Torashima, Chigasaki (JP); Susumu Yasuda, Machida (JP); Yasuhiro Shimada, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 226 days.

(21) Appl. No.: 11/091,630

(22) Filed: Mar. 29, 2005

(65) Prior Publication Data

US 2005/0225822 A1  Oct. 13, 2005

(30) Foreign Application Priority Data

Mar. 31, 2004  (JP)  .............................. 2004-105838

(51) Int. Cl.
*G02B 26/08* (2006.01)
*G02B 26/00* (2006.01)
(52) U.S. Cl. .................... 359/197; 359/224; 359/290; 359/291; 359/298; 359/318
(58) Field of Classification Search ................ 359/197, 359/223, 224, 290–292, 298, 318, 280–283
See application file for complete search history.

(56) References Cited

U.S. PATENT DOCUMENTS

| 6,201,629 B1 * | 3/2001 | McClelland et al. ......... 359/223 |
| 6,456,413 B1 | 9/2002 | Asada ........................ 359/199 |
| 6,538,799 B2 * | 3/2003 | McClelland et al. ......... 359/291 |
| 6,803,843 B2 * | 10/2004 | Kato et al. .................. 335/78 |
| 6,813,054 B2 * | 11/2004 | Aksyuk et al. .............. 359/224 |

FOREIGN PATENT DOCUMENTS

JP  2000-249964  9/2000

\* cited by examiner

*Primary Examiner*—Evelyn A. Lester
(74) *Attorney, Agent, or Firm*—Fitzpatrick, Cella, Harper & Scinto

(57) ABSTRACT

An optical deflector including a support substrate, a movable member, a reflective face, and a mounting structure for fixing the support substrate thereto. The movable member is rotatably or swingingly supported by the support substrate through elastic support members. The reflective face is provided on the movable member and deflects light incident thereon when the movable member is swung relatively to the support substrate. In the optical deflector, neutral surfaces of bending in a direction of a normal to the reflective face in the elastic support member and the movable member are not present in the same plane, and the support substrate is fixed to the mounting structure at a face of the support substrate on a side of the neutral surface in the movable member opposite to a side of the neutral surface in the elastic support member.

20 Claims, 11 Drawing Sheets

OPTICAL DEFLECTOR HAVING NEUTRAL SURFACE OF BENDING IN MOVABLE MEMBER IN DIFFERENT PLANE FROM NEUTRAL SURFACE OF BENDING IN ELASTIC SUPPORT MEMBER

BACKGROUND OF THE INVENTION

1. Field of the Invention

The present invention relates to an optical deflector capable of being fabricated by techniques of micromechanics, an image forming apparatus using the optical deflector, and the like.

2. Description of the Related Background Art

In recent years, as represented by high integration of semiconductor devices, enhancement of performance and miniaturization of a variety of devices or apparatuses have been advanced as development of microelectronics proceeds. The same also holds true in apparatuses using micromachine devices (for example, a micro optical deflector, a micro mechanical-amount sensor, and a microactuator having a swinging member swingingly rotatable about a twisting torsional axis) fabricated by techniques of micromechanics using silicon process.

Enhancement of performance and miniaturization also advance in fields of (a) a laser beam printer, (b) an image displaying apparatus, such as a head mount display, and (c) a light input device, such as a barcode reader, each of which uses an optical deflector for achieving optical scan, for example. Furthermore, it is desired to apply those techniques to fabrication of products which are further miniaturized and formed in a readily-portable form, for example.

Figure 1A:
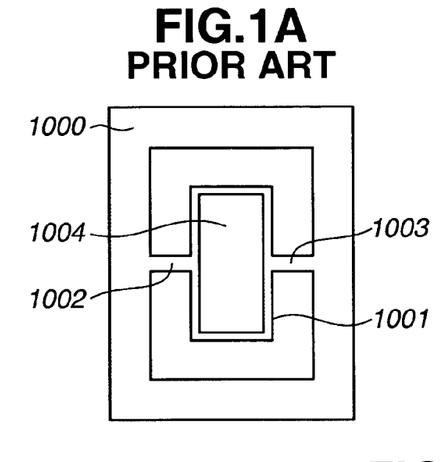
FIG. 1A is a plan view, viewed from a top side, illustrating a conventional optical deflector.
Figure 1B:
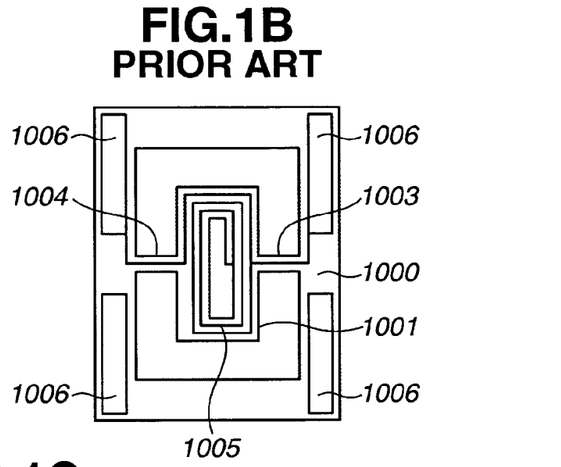
FIG. 1B is a plan view, viewed from a bottom side, illustrating the optical deflector of FIG. 1A.
Figure 1C:
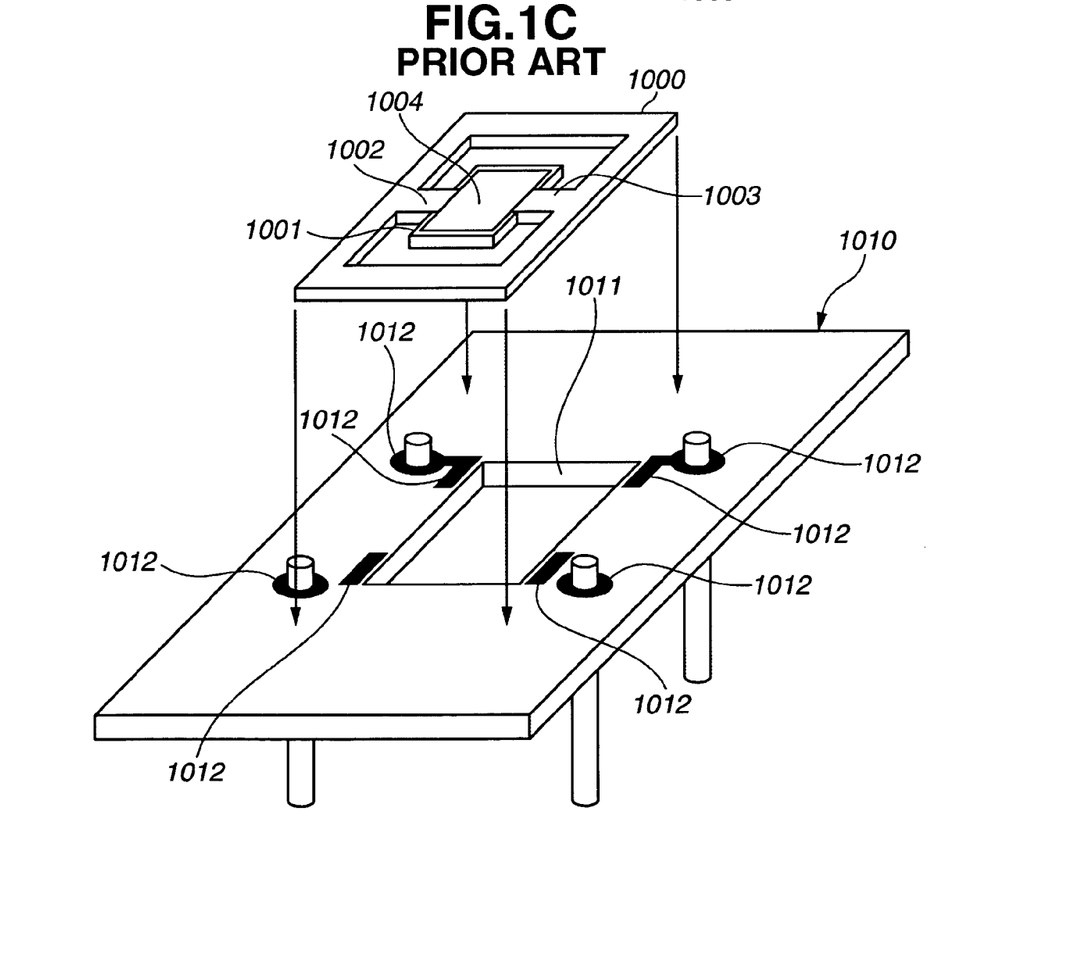
FIG. 1C is a perspective view illustrating an assembling process of the optical deflector of FIG. 1A.

Japanese Patent Application Laid-Open No. 2000-249964 (its U.S. counterpart is U.S. Pat. No. 6,456,413) discloses an optical deflector having a swinging member capable of being swingingly rotated about a twisting torsional axis, as illustrated in FIGS. 1A to 1C. FIG. 1A is a top plan view of the optical deflector, FIG. 1B is a bottom plan view of the optical deflector, and FIG. 1C is a perspective view illustrating a mounting process of mounting the optical deflector to a mounting structure. In the optical deflector, a movable member 1001 and elastic support members 1002 and 1003 for rotatably supporting the movable member 1001 are integrally formed in a silicon substrate 1000. A reflective face 1004 is formed on a front face of the movable member 1001, and a driving coil 1005 is provided on a rear face of the movable member 1001. A magnetic-field generating unit for applying a magnetic field to the driving coil 1005 is further provided, and the movable member 1001 can be driven by a magnetic force generated when a current is caused to flow in the driving coil 1005.

In the mounting structure of the above-discussed optical deflector, a space portion 1011 for allowing the swinging rotation of the movable member 1001 is formed in a deflector-arranging region of a mounting substrate 1010 for fixing the optical deflector thereto, and a conductive pattern 1012 is formed near the deflector-arranging region. When the optical deflector is fixed to the mounting substrate 1010, an electrode terminal 1006 of the driving coil 1005 formed on a rear face of the semiconductor substrate 1000 of the optical deflector is brought into contact with the conductive pattern 1012.

In (a) a laser beam printer, (b) an image displaying apparatus, such as a head mount display, and (c) a light input device, such as a barcode reader, which perform optical scanning by using the above-discussed micro-machine device, a flatness is required for the reflective face for deflecting light.

However, in the event that a support substrate for forming a movable member and an elastic support member is fixed, a stress occurring at the time of fixation, a thermal stress and the like are likely to act on the substrate, leading to deformation of the movable member. Accordingly, a face precision or flatness of the reflective face serving as a light deflecting unit decreases.

SUMMARY OF THE INVENTION

In one aspect, the present invention relates to an optical deflector comprising: (1) a support substrate, wherein a movable portion (e.g., a movable member or the like) of said optical deflector is swingingly supported by said support substrate through at least two elastic support portions (e.g., elastic support members or the like); (2) a reflective face, said reflective face (a) being provided on said movable portion, and (b) deflecting light incident thereon when said movable portion is swung relatively to said support substrate; and (3) a mounting structure for fixing said support substrate thereto, wherein a neutral surface of bending in a direction of a normal to said reflective face in said movable member is not present in the same plane as neutral surfaces of bending in a direction of a normal to said reflective face in said elastic support portions, and wherein said support substrate is fixed to said mounting structure at a face of said support substrate on a side of the neutral surface in said movable portion opposite to a side of the neutral surface in the elastic support portions.

In another aspect, the present invention relates to an optical deflector comprising: (1) an elastic support portion; (2) a movable portion, said movable portion being swingingly supported by said elastic support portion; (3) a support substrate connected to said elastic support portion; and (4) a mounting structure for fixing said support substrate thereto, wherein said movable portion is provided with a reflective face for deflecting light incident thereon when said movable portion is swung, and wherein a neutral surface in said elastic support portion and a neutral surface in said movable portion are not present in the same plane.

In yet another aspect, the present invention relates to an image forming apparatus comprising: (1) a light source; and (2) an optical deflector as discussed above, said optical deflector deflecting light from said light source to form an image.

In a still further aspect, the present invention relates to an optical deflector comprising: (1) a movable member having a surface for deflecting light incident thereupon; and (2) an elastic support member for supporting said movable member, wherein a plane defined by a location in a thickness direction of said movable member, the length of which plane in a longitudinal direction remains unchanged when said movable member is bent, is a different plane from a plane defined by a location in a thickness direction of said elastic support member, the length of which plane in a longitudinal direction remains unchanged when said elastic support member is bent.

According to one aspect of the present invention for solving the above problem, there is provided an optical deflector that includes a support substrate, a movable member which is rotatably or swingingly supported by the support substrate through at least two elastic support members (for example, a pair of torsion bars extending along a line with the movable member being interposed between the torsion bars), a reflective face which is provided on the movable member and deflects light incident thereon when the movable member is swung relatively to the support substrate, and a mounting structure for fixing the support substrate thereto. In the optical deflector, neutral surfaces of bending in a direction of a normal to the reflective face in the elastic support member and the movable member are not present in the same plane (typically, present in different planes, respectively), and the support substrate is fixed to the mounting structure at a face of the support substrate on a side of the neutral surface in the movable member opposite to a side of the neutral surface in the elastic support member.

According to another aspect of the present invention for solving the above problem, there is provided an optical deflector that includes an elastic support member, a movable member which is rotatably or swingingly supported by the elastic support member, a support substrate connected to the elastic support member, and a mounting structure for fixing the support substrate thereto. In the optical deflector, light incident on a reflective face provided on the movable member is deflected when the movable member is swingingly rotated, and neutral surfaces of the elastic support member and the movable member are not present in the same plane (typically, present in different planes, respectively).

Further, according to another aspect of the present invention for solving the above problem, there is provided an image forming apparatus which includes a light source, and the above-described optical deflector for deflecting light from the light source to form an image on a desired surface. Naturally, an optical deflector of the present invention can be used not only in laser beam printers and copying machines for performing optical scanning (these are examples of an electrophotographic image forming apparatus in which an electrostatic latent image is formed on a photosensitive member), and projector image displaying apparatuses for projecting an image on a desired surface, such as a head mount display, but also in light input devices, such as a barcode reader, and the like.

According to the present invention, it is possible to offset convex-shaped (or concave-shaped) deformation of the reflective face due to a tensile (or compressive) stress by concave-shaped (or convex-shaped) deformation of the reflective face due to a bending moment, since the neutral surfaces of bending in the direction of a normal to the reflective face in the elastic support member and the movable member are not present in the same plane, and the support substrate is fixed to the mounting structure at the face of the support substrate on the side of the neutral surface in the movable member opposite to the side of the neutral surface in the elastic support member. Therefore, reduction in a flatness of the reflective face can be effectively prevented.

Thus, it is possible to prevent deformation of the reflective face, which serves as a light deflecting unit, due to a stress occurring at the time of fixation, a thermal stress and the like. Further, it is possible to prevent degradation in quality of an image or the like formed by using such a reflective face.

These advantages, as well as others, will be more readily understood in connection with the following detailed description of the preferred embodiments and examples of the invention in connection with the drawings.

DETAILED DESCRIPTION OF THE PREFERRED EMBODIMENTS

The principle of a concept of the present invention will be described prior to a description of embodiments of an optical deflector and an image forming apparatus according to the present invention.

Initially, a neutral surface of the present invention will be discussed. In the event that a member is bent in a bow-shaped form, lengths in a longitudinal direction (see a direction 730 indicated in FIG. 9B) of front and rear surfaces of the member become different from each other. For example, when the member is bent in a bow-shaped form with its front surface being inside, the length in the longitudinal direction of the front surface becomes shorter than before. In contrast thereto, the length in the longitudinal direction of the rear surface becomes longer than before.

A neutral surface is a plane whose length in the longitudinal direction remains unchanged even if the member is bent. Where the shape of a member is subjected to no special processing (for example, where a member has a simple rectangular shape), a neutral surface is present at a middle position in a thickness direction (see a direction 720 indicated in FIG. 9B) of the member between the front surface and the rear surface.

Where a member has a concave portion, a convex portion, or the like, a neutral surface in a portion having such a shape is different from a neutral surface in a flat portion without such a shape. In the present invention, a neutral surface is defined by a location in a thickness direction, whose length in a longitudinal direction remains unchanged over the entire member, including the above case of the member with a concave portion, a convex portion, or the like.

A description will now be given for a mounting structure or jig in the present invention. A mounting structure is a structure or jig for fixing a support substrate thereto. The support substrate has an elastic support member and a movable member rotatably or swingingly supported by the elastic support member, and thus supports the movable member through the elastic support member. The movable member is vibrated about an axis of the elastic support member by a force such as an electrostatic force and an electromagnetic force.

Here, the vibration is a motion in which a face of the movable member is swung in a reciprocating manner (not a motion in which the movable member is rotated in a single direction about the axis). The mounting structure allows such a swinging motion of the movable member, and is a jig which arranges and fixes the support substrate such that the front and rear faces of the movable member do not impinge against another member during the swinging motion.

More specifically, the mounting structure fixes the support substrate at its face on a side opposite to a side of a face of the movable member or a reflective face provided on a face of the movable member. Another member may or may not be disposed on a side opposite to a side of the reflective face. More preferably, another member including a driving unit for vibrating the movable member can be disposed on a side opposite to a side of the reflective face. The driving unit is one of a coil and a permanent magnet when the movable member is driven by an electromagnetic force. The other of the coil and the permanent magnet can be arranged in a drive member. The mounting structure can be a portion of the above-discussed another member, or can be a member different therefrom.

In an example of an optical deflector with the above-discussed mounting structure and so forth, a movable member is rotatably or swingingly supported by a support substrate through two elastic support members, and a reflective face is formed on one surface of the movable member by depositing a highly-reflective film of an aluminum, a dielectric multi-layer, or the like thereon. The movable member can be supported through more than two elastic support members (e.g., three torsion bars extending along a line can be provided with small and large movable members therebetween, and a linearly-extending torsional axis is established by one torsion bar disposed on one side of the movable member and two torsion bars disposed on the other side of the movable member). The movable member can be driven relatively to the support substrate by externally applying a vibration force to the movable member, and light incident on the reflective face can hence be deflected.

In such a structure, in the event that the support substrate is fixed to the mounting structure by junction, adhesive agent, or the like, stresses, such as a stress occurring at the time of fixation and a thermal stress, act on the support substrate. Therefore, a structure according to the present invention is constructed such that neutral surfaces of bending in a direction (see a direction 1100 illustrated in FIG. 2B) f a normal to the reflective face in the elastic support member and the movable member are not present in the same plane, and the support substrate is fixed to the mounting structure at a face of the support substrate on a side of the neutral surface in the movable member opposite to a side of the neutral surface in the elastic support member. It is accordingly possible to offset deformation due to a tensile (or compressive) stress by deformation due to a bending moment, and prevent reduction in a flatness of the reflective face.

Figure 8A:
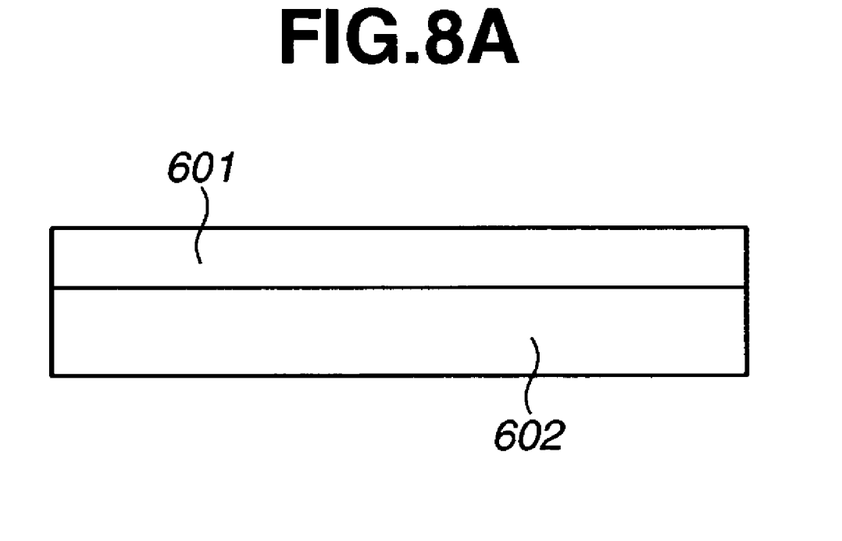
FIG. 8A is a cross-sectional view showing the principle of the present invention.
Figure 8B:
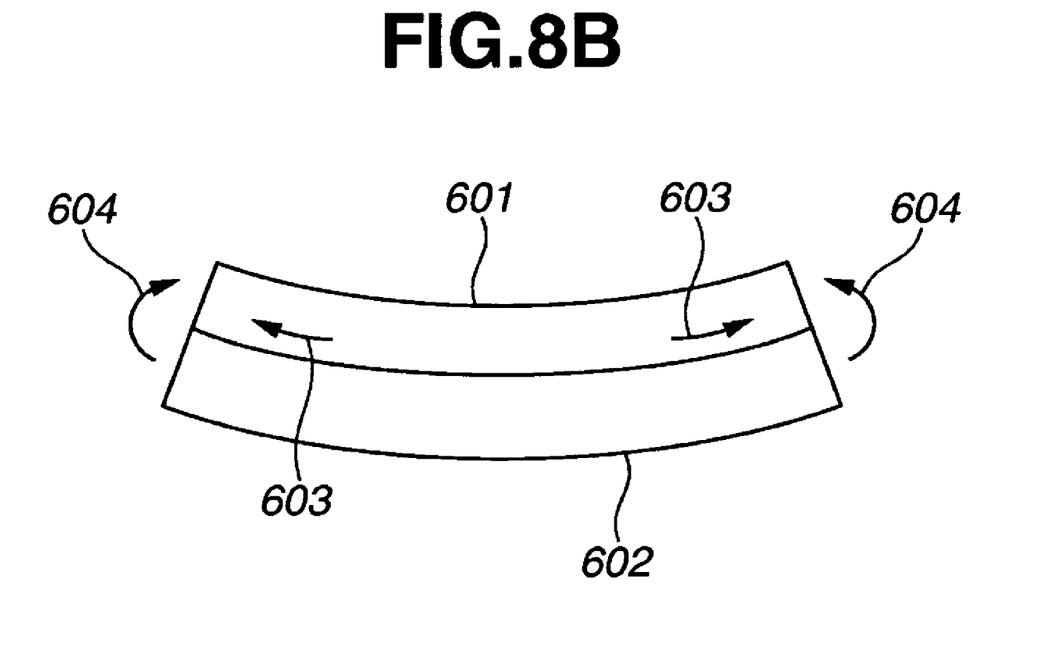
FIG. 8B is a cross-sectional view showing the principle of the present invention.

FIGS. 8A to 10B describe the principle of the present invention. As illustrated in FIG. 8A, it is assumed that substrates 601 and 602 having different thermal expansion coefficients and elastic coefficients are fixed to each other. The thermal expansion coefficient of the substrate 601 is smaller than that of the substrate 602, and the elastic coefficient of the substrate 601 is larger than that of the substrate 602. When the thus-fixed substrates 601 and 602 are heated, a tensile stress 603 and a bending moment 604 simultaneously act on the substrate 601, as illustrated in FIG. 8B. Conversely, when the temperature of the thus-fixed substrates 601 and 602 is lowered, a compressive stress and a bending moment in a reverse direction simultaneously act on the substrate 601.

Figure 9A:
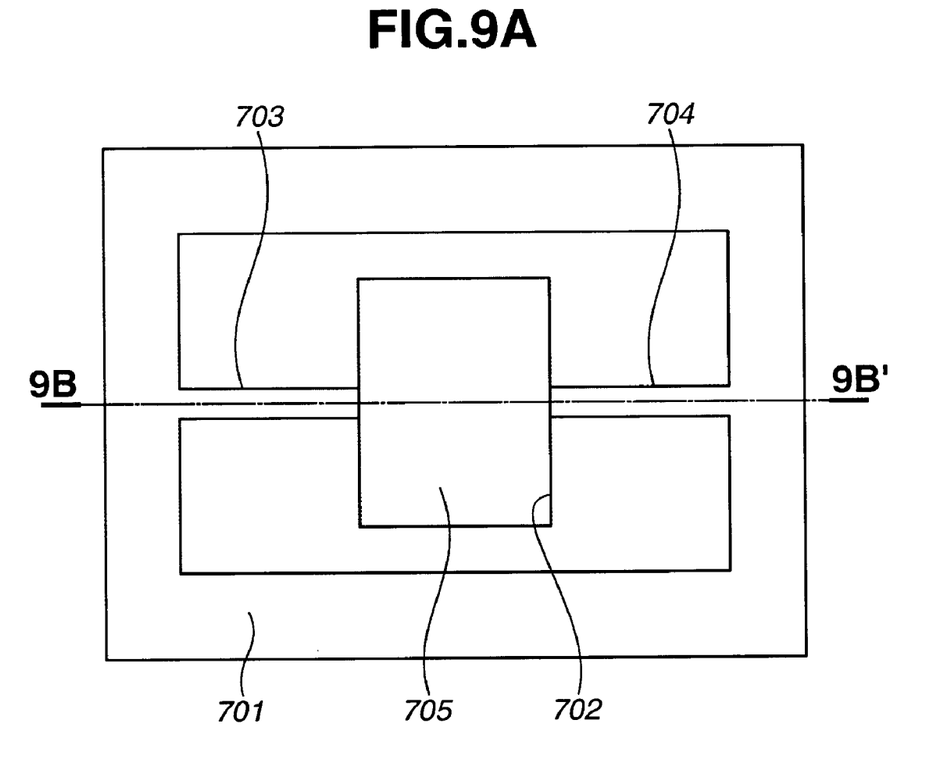
FIG. 9A is a plan view of an optical deflector, viewed from a top side, showing the principle of the present invention.
Figure 9B:
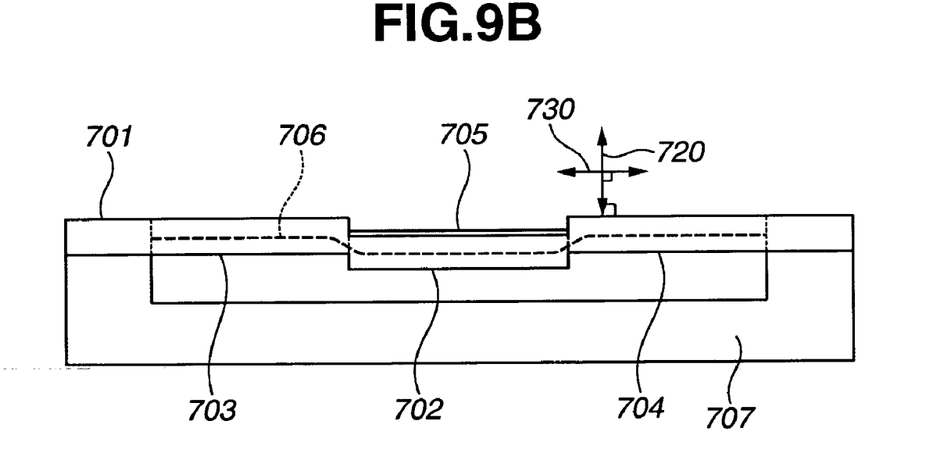
FIG. 9B is a cross-sectional view, taken along section 9B–9B' in FIG. 9A, illustrating the optical deflector of FIG. 9A.
Figure 10A:
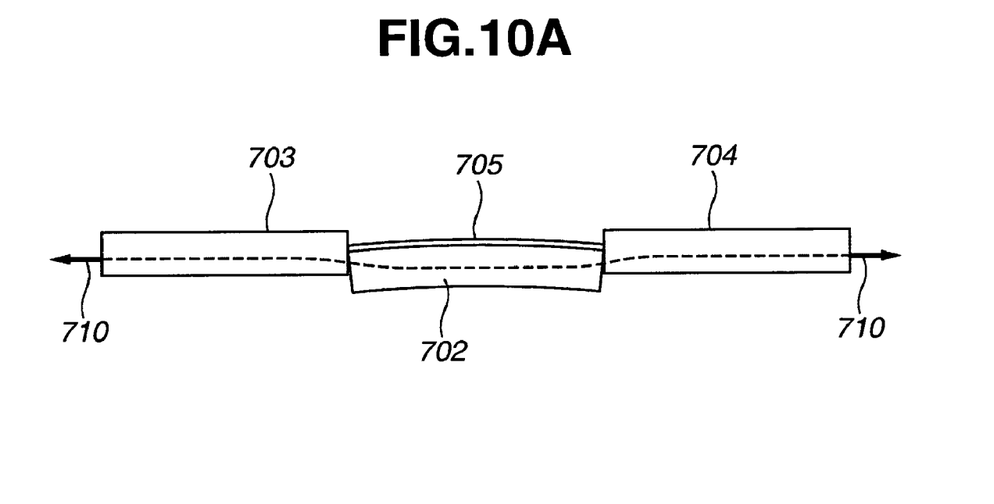
FIG. 10A is a cross-sectional view of an optical deflector on which a stress acts when the optical deflector is heated, showing the principle of the present invention.
Figure 10B:
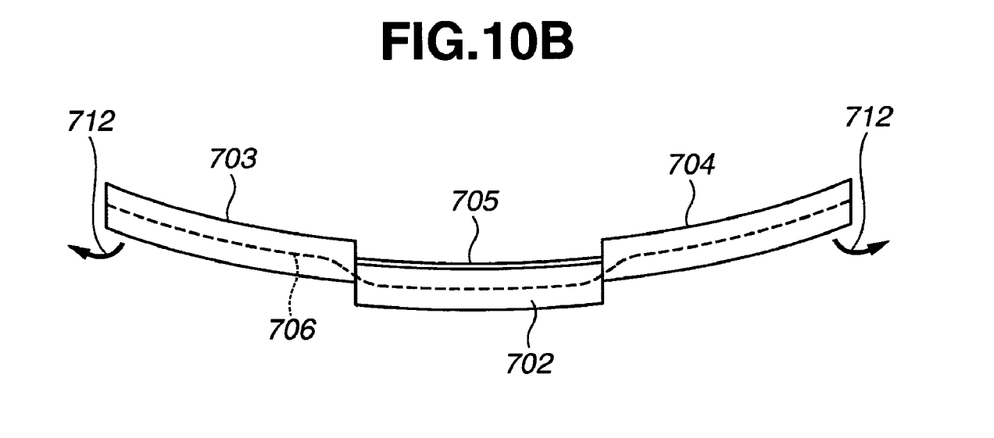
FIG. 10B is a cross-sectional view of an optical deflector on which a bending moment acts when the optical deflector is heated, showing the principle of the present invention.

FIG. 9A is a plan view of an optical deflector, and FIG. 9B is a cross-sectional view, taken along section 9B–9B' of FIG. 9A, showing the principle of the present invention. FIGS. 10A and 10B are cross-sectional views of the optical deflector on which a stress or a bending moment acts when the optical deflector is heated.

As illustrated in FIG. 9B, a neutral surface 706 of bending is a surface that is not influenced by either tension or compression when a movable member 702 is bent or elastic support members 703 and 704 are bent. In this structure, neutral surfaces 706 of bending in the direction of a normal to a reflective face 705 in the elastic support members 703 and 704 and the movable member 702 are not present in the same plane, and the support substrate 701 is fixed to a mounting structure 707 at a face of the support substrate 701 on a side of the neutral surface 706 in the movable member 702 opposite to a side of the neutral surface 706 in the elastic support members 703 and 704.

In the thus-established structure, as illustrated in FIGS. 10A and 10B, the reflective face 705 tends to be bent into a convex shape by a tensile stress 710, while the reflective face 705 tends to be bent into a concave shape by a bending moment 712 acting on the movable member 702. It is accordingly possible to offset deformation of the reflective face 705 due to the tensile stress by deformation of the reflective face 705 due to the bending moment, and improve a flatness of the reflective face 705. When the temperature is lowered, the reflective face 705 tends to be bent into a concave shape by a compressive stress, and the reflective face 705 tends to be bent into a convex shape by a bending moment acting on the movable member 702. Thus, deformations of the reflective face 705 due to the compressive stress and the bending moment are offset by each other, so that reduction in a flatness of the reflective face 705 can be prevented The apparatus can be readily produced at a relatively-low cost since a support substrate 701, the elastic support members 703 and 704, and the movable member 702 can be integrally fabricated. In an example of an optical deflector, a convex portion is formed on face on a side opposite to a side of the reflective face of the movable member to displace the neutral surface in the movable member, such that neutral surfaces of bending in the direction of a normal to the reflective face in the elastic support member and the movable member are not present in the same plane. Further, the support substrate is fixed to the mounting structure at a face of the support substrate on the side of the neutral surface in the movable member opposite to the side of the neutral surface in the elastic support member.

Accordingly, based on the above-discussed principle, the reflective face tends to be bent into a convex shape (or a concave shape) by a tensile (or compressive) stress acting on the movable member, and the reflective face tends to be bent into a concave shape (or a convex shape) by a bending moment. Deformations of the reflective face due to the stress and the bending moment are offset by each other, so that reduction in a flatness of the reflective face can be prevented.

In another example of an optical deflector, a concave portion is formed on a face of the movable member on a side opposite to a side of the reflective face to displace the neutral surface in the movable member, such that neutral surfaces of bending in the direction of a normal to the reflective face in the elastic support member and the movable member are not present in the same plane. In such a structure, similarly to the above structure, deformations of the reflective face due to the tensile (or compressive) stress and the bending moment can be offset by each other, so that a flatness of the reflective face can be improved.

Further, in another example of an optical deflector, a shape of a cross section perpendicular to a longitudinal direction of an elastic support member is made asymmetrical with respect to a neutral surface of bending such that the neutral surface of the elastic support member is displaced. Thus, neutral surfaces of bending in the direction of a normal to the reflective face in the elastic support member and the movable member are not present in the same plane. Further, the support substrate is fixed to the mounting structure at a face of the support substrate on a side of the neutral surface in the movable member opposite to a side of the neutral surface in the elastic support member.

For example, the cross section of the elastic support member may be shaped into an X-shape, a V-shape, or the like that is asymmetrical with respect to the neutral surface. Such a shape of the elastic support member can be readily fabricated by an anisotropic wet etching. Also in such a structure, the reflective face tends to be bent into a convex shape (or a concave shape) by a tensile (or compressive) stress acting on the movable member, and the reflective face tends to be bent into a concave shape (or a convex shape) by a bending moment. Accordingly, deformations of the reflective face due to the stress and the bending moment are offset by each other, so that reduction in a flatness of the reflective face can be prevented.

In an image forming apparatus using the above-discussed optical deflector, degradation of quality of an image occurs if a flatness of a reflective face decreases. A stable image, however, can be achieved when an optical deflector with the above-discussed reflective face having a high flatness is employed. For example, in an image forming apparatus, such as a projector, using an optical deflector of the present invention for scanning light in at least one of a vertical direction and a horizontal direction, a stable image can be obtained because a surface precision of the reflective face is high.

Naturally, an optical deflector of the present invention can be preferably used not only in an image forming apparatus, such as a projector, but also in an image forming apparatus, such as a laser beam printer and a copying machine, i.e., an image forming apparatus in which an electrostatic latent image is formed on a photosensitive member to obtain an image from the electrostatic latent image, using electrophotographic techniques, and which includes at least an optical deflector and a light source.

More specific embodiments of an optical deflector and an image forming apparatus according to the present invention will hereinafter be described with reference to FIGS. 2A through 10B.

Figure 2A:
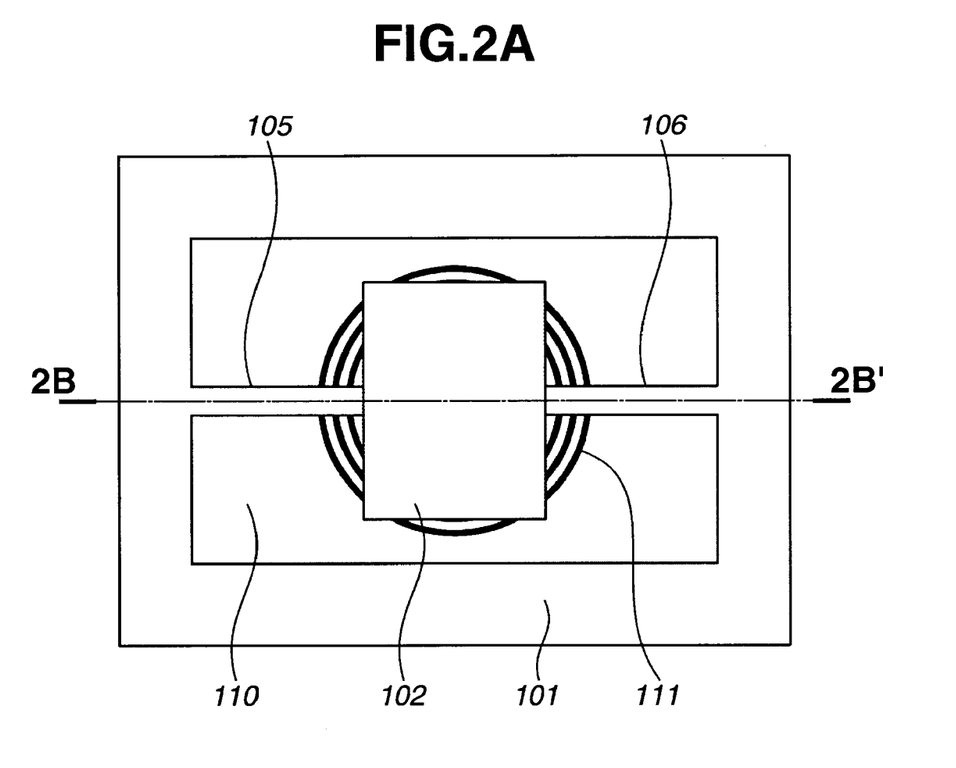
FIG. 2A is a plan view, viewed from a top side, illustrating an optical deflector of a first embodiment according to the present invention.
Figure 2B:
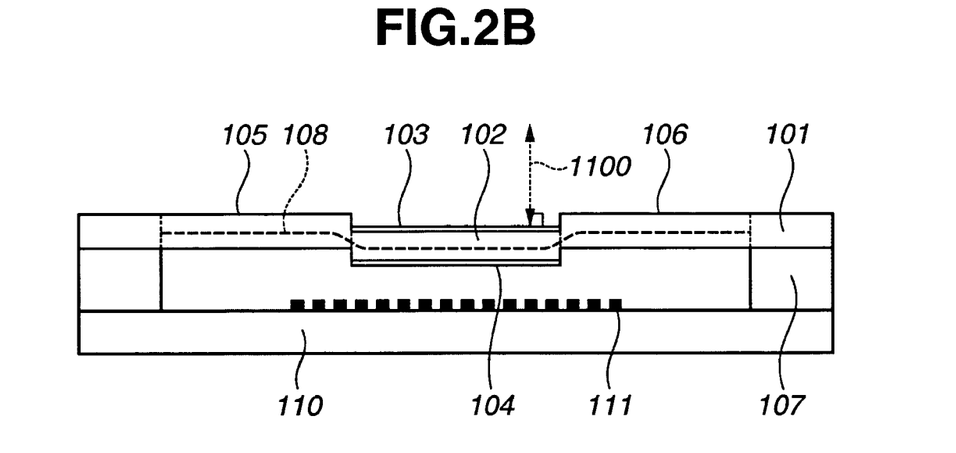
FIG. 2B is a cross-sectional view, taken along section 2B–2B' in FIG. 2A, illustrating the optical deflector of FIG. 2A.

A first embodiment of an optical deflector will be first described with reference to FIGS. 2A and 2B. In this optical deflector, a movable member 102 is formed in a support substrate 101 of silicon single crystal, and the movable member 102 is rotatably supported by two elastic support members 105 and 106 about a twisting torsional axis or a swinging central axis (this axis extends along a line 2B–2B' which also indicates the section in FIG. 2A). As illustrated in FIG. 2B, the movable member 102 is disposed below the elastic support members 105 and 106 such that neutral surfaces 108 of bending in a direction of a normal to a reflective face 103 in the elastic support members 105 and 106 and the movable member 102 are not present in the same plane. The reflective face 103 is formed on one surface of the movable member 102 by coating a highly-reflective film of an aluminum, a dielectric multi-layer, or the like thereon.

Further, a layer of a hard magnetic material 104 is formed by plating or the like on the other surface of the movable member 102. The hard magnetic material 104 is magnetized perpendicularly to the twisting torsional axis defined by the elastic support members 105 and 106.

The support substrate 101 of silicon single crystal is fixed to a metal mounting structure 107 of aluminum or the like at a face of the support substrate 101 on a side of the neutral surface 108 in the movable member 102 opposite to a side of the neutral surface 108 in the elastic support members 105 and 106. In this fixation, the movable member 102 is arranged facing a coil substrate 110 such that a predetermined distance is established between the movable member 102 and a driving coil 111 on the coil substrate 110. The mounting structure 107 can be formed of a material other than aluminum, and the support substrate 101 can be fixed to the mounting structure 107 by junction, adhesive agent, or the like.

In the above-discussed structure, a magnetic field is generated from the coil 111 when a current is caused to flow in the coil 111. Torque due to the generated magnetic field acts on the hard magnetic material 104 on the movable member 102, and the movable member 102 is accordingly driven. The driving system can be an electrostatic system, a piezoelectric system, or the like.

The thermal expansion coefficient of the mounting structure 107 of aluminum is larger than that of the support substrate 101 of silicon single crystal, and the elastic coefficient of the mounting structure 107 of aluminum is smaller than that of the support substrate 101 of silicon single crystal. Therefore, when the optical deflector is used at relatively high temperatures, a tensile stress and a bending moment occur in the support substrate 101. Since the support substrate 101 is fixed to the mounting structure 107 as discussed above, it is possible to offset deformation of the reflective face 103 due to the tensile stress by deformation of the reflective face 103 due to the bending moment, and prevent reduction in a flatness of the reflective face 103.

Even when the optical deflector is used at relatively low temperatures, it is possible to offset deformation of the reflective face 103 due to the compressive stress by deformation of the reflective face 103 due to the bending moment. Further, even in a case where the relationships of thermal expansion coefficient and elastic coefficient between the mounting structure 107 and the support substrate 101 are opposite to those described above, deformations of the reflective face 103 can be offset by each other on the same principle. In such a case, a compressive stress and a bending moment corresponding thereto occur in the support substrate 101 when the optical deflector is used at high temperatures, white a tensile stress and a bending moment corresponding thereto occur in the support substrate 101 when the optical deflector is used at low temperatures.

According to the construction of the above-discussed optical deflector of the first embodiment, it is possible to achieve a flatness of the reflective face 103 in a range from 0° C. to 80° C. below 50 nm (i.e., its peak deviation of height from a flat face can be depressed within 50 nm).

Figure 3:
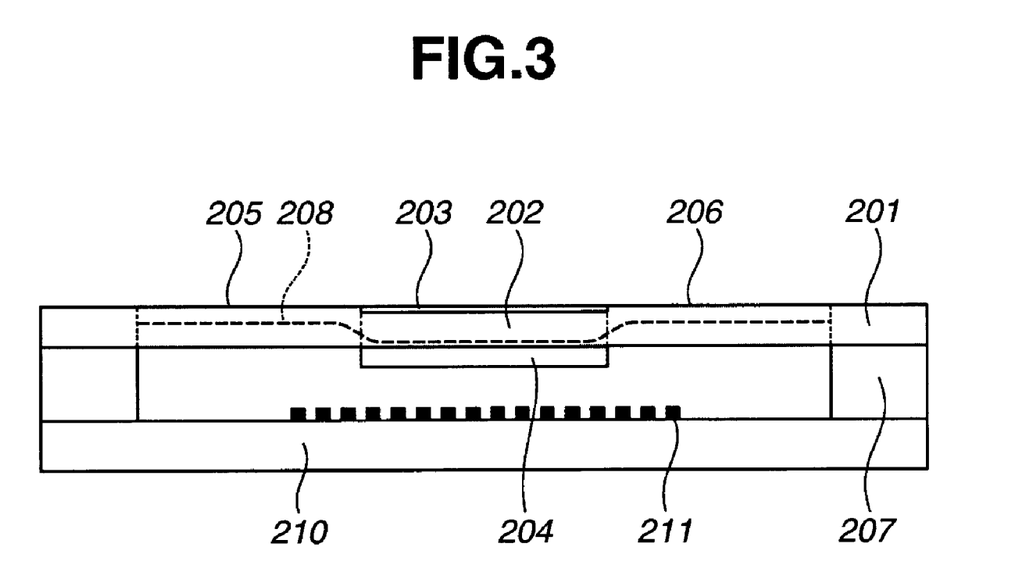
FIG. 3 is a cross-sectional view illustrating an optical deflector of a second embodiment according to the present invention.

A second embodiment of an optical deflector will be described with reference to FIG. 3. This optical deflector has about the same structure as the optical deflector of the first embodiment. A movable member 202 and elastic support members 205 and 206 are integrally formed using bulk micro-machining techniques. The optical deflector of the second embodiment is different from that of the first embodiment in that a bulk permanent magnet 204 is disposed on a face of the movable member 202 opposite to a reflective face 203 (of the movable portion 202) to form a protruding portion on this face. Reference numeral 210 designates a coil substrate, and reference numeral 211 designates a driving coil.

Accordingly, a neutral surface 208 of bending in a direction of a normal to the reflective face 203 in the movable member 202 is displaced such that neutral surfaces 208 in the movable member 202 and the elastic support members 205 and 206 are not present in the same plane. Further, a support substrate 201 is fixed to a mounting structure 207 formed of a resin at a face of the support substrate 201 on a side opposite to a side of the reflective face 203.

When heat is applied to the optical deflector of the second embodiment, a tensile stress and a bending moment occur in the support substrate 201 similarly to the first embodiment, since the thermal expansion coefficient of the resin of the mounting structure 207 is larger than that of the silicon single crystal of the support substrate 201, and the elastic coefficient of the mounting structure 207 of the resin is smaller than that of the support substrate 201 of the silicon single crystal. The support substrate 201 is fixed to the mounting structure 207 as discussed above, so that it is possible to offset deformation of the reflective face 203 due to the tensile stress by deformation of the reflective face 203 due to the bending moment, and prevent reduction in a flatness of the reflective face 203.

According to the construction of the above-discussed optical deflector of the second embodiment, it is also possible to achieve a flatness of the reflective face 203 in a range from 0° C. to 80° C. below 50 nm.

Figure 4A:
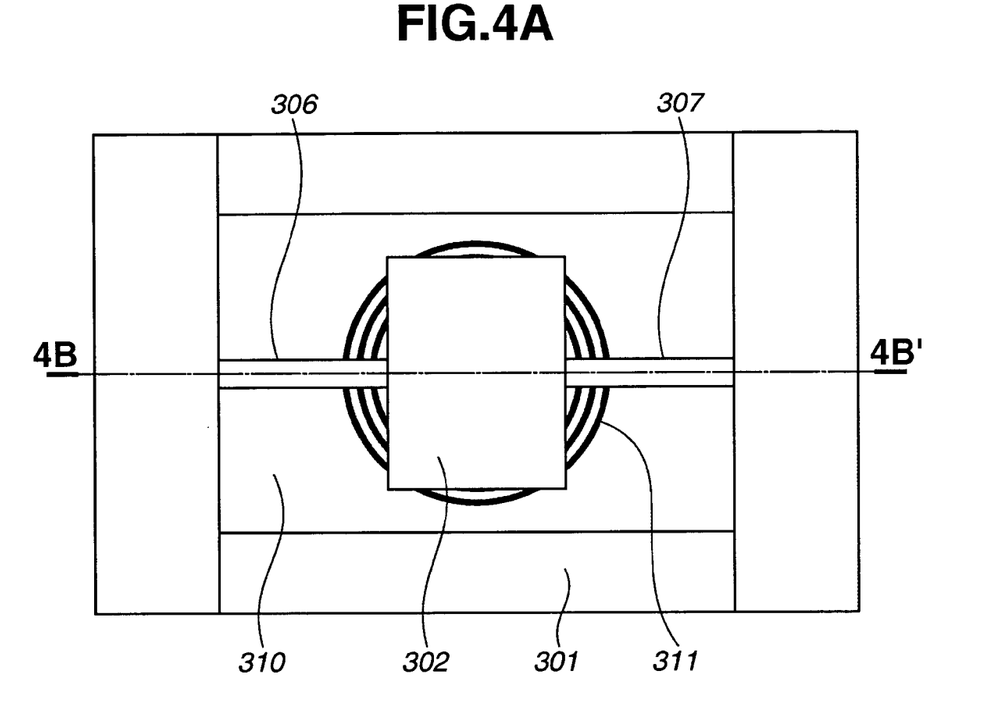
FIG. 4A is a plan view, viewed from a top side, illustrating an optical deflector of a third embodiment according to the present invention.
Figure 4B:
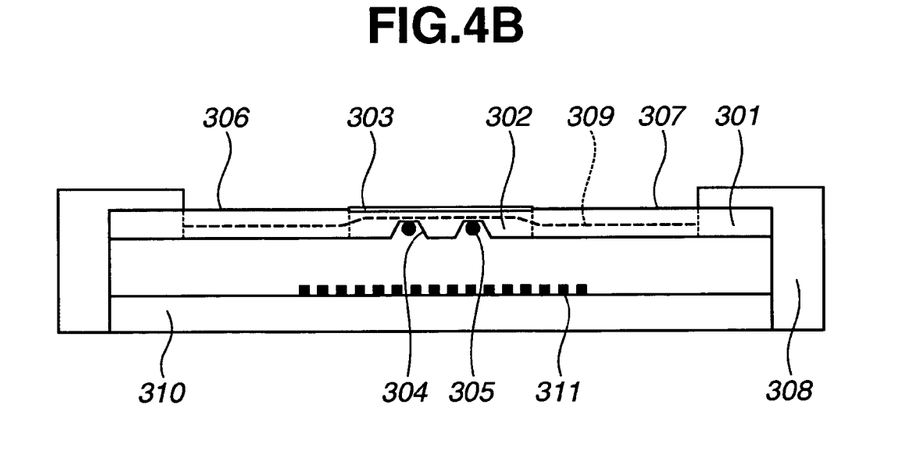
FIG. 4B is a cross-sectional view, taken along section 4B–4B' in FIG. 4A, illustrating the optical deflector of FIG. 4A.

A third embodiment of an optical deflector will be described with reference to FIGS. 4A and 4B. This optical deflector has about the same structure as the optical deflectors of the first and second embodiments. A movable member 302 and elastic support members 306 and 307 are integrally formed using bulk micro-machining techniques. The optical deflector of the third embodiment is different from those of the first and second embodiments in that a groove (a concave portion) 304 is formed on a face of the movable member 302 opposite to a face with a reflective face 303, and a support substrate 301 is fixed to a mounting structure 308 formed of a metal at a face of the support substrate 301 on the same side as the reflective face 303. In place of, or together with the concave portion, a convex portion can be formed on the face of the movable member 302 opposite to the face with the reflective face 303.

A hard magnetic material 305, such as an alloy magnet containing Fe, Co, and Cr, is disposed in the groove 304. The hard magnetic material 305 is magnetized in a direction perpendicular to a twisting torsional axis defined by the elastic support members 306 and 307. The hard magnetic material 305 can have a relatively-large magnetic force since it can be shaped into a bulk member. In the above-discussed structure, a magnetic field is generated from a coil 311 on a coil substrate 310 when a current is caused to flow in the coil 311. Torque due to the generated magnetic field acts on the hard magnetic material 305 on the movable member 302, and the movable member 302 is accordingly driven. When a current with the same frequency as an eigen frequency of the movable member 302 is caused to flow in the coil 311, a resonant drive of the movable member 302 can be carried out.

When heat is applied to the optical deflector of the third embodiment, a tensile stress and a bending moment occur in the support substrate 301 which has a relatively-small thermal expansion coefficient and a relatively-large elastic coefficient, similarly to the first and second embodiments. In the third embodiment, to cope with such phenomenon, the groove 304 is formed on the movable member 302 to displace a neutral surface 309 of the movable member 302 from its center such that neutral surfaces 309 of bending in a direction of a normal to the reflective face 303 in the movable member 302 and the elastic support members 306 and 307 are not present in the same plane.

Further, the support substrate 301 of silicon single crystal is fixed to the mounting structure 308 formed of a metal at a face of the support substrate 301 on the same side as the reflective face 303. It is accordingly possible to offset deformation of the reflective face 303 due to the tensile stress by deformation of the reflective face 303 due to the bending moment, and prevent reduction in a flatness of the reflective face 303.

According to the construction of the above-discussed optical deflector of the third embodiment, it is also possible to achieve a flatness of the reflective face 303 in a range from 0° C. to 80° C. below 50 nm.

Figure 5A:
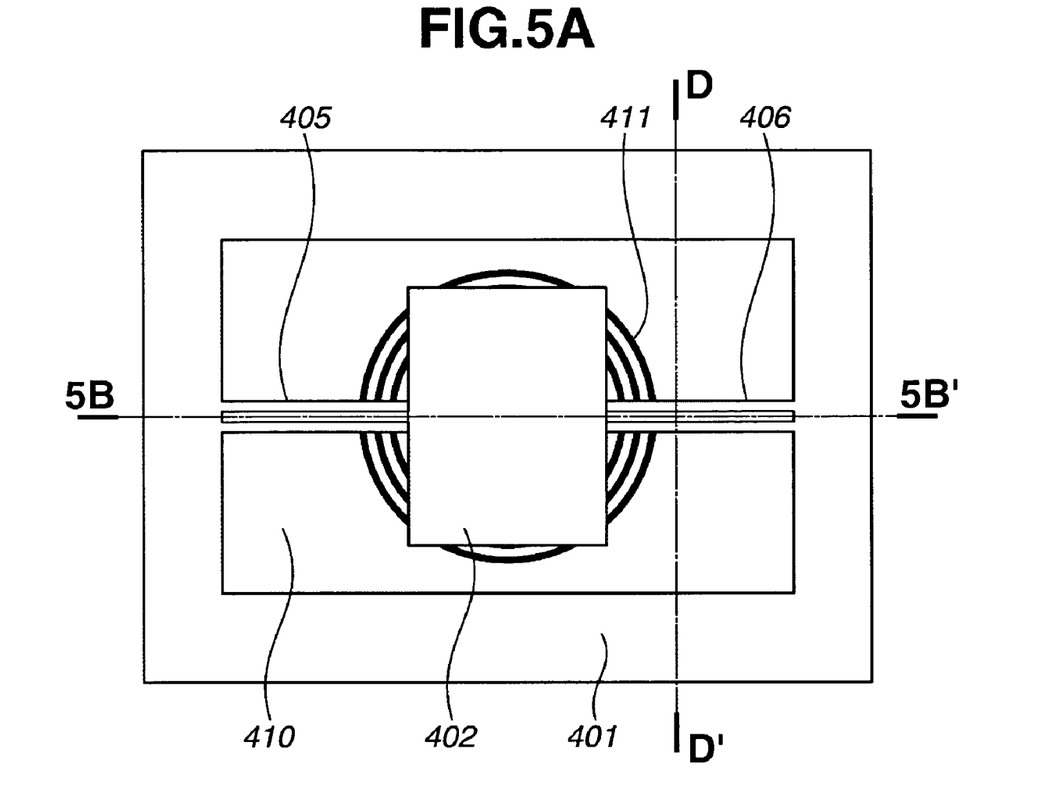
FIG. 5A is a plan view, viewed from a top side, illustrating an optical deflector of a fourth embodiment according to the present invention.
Figure 5B:
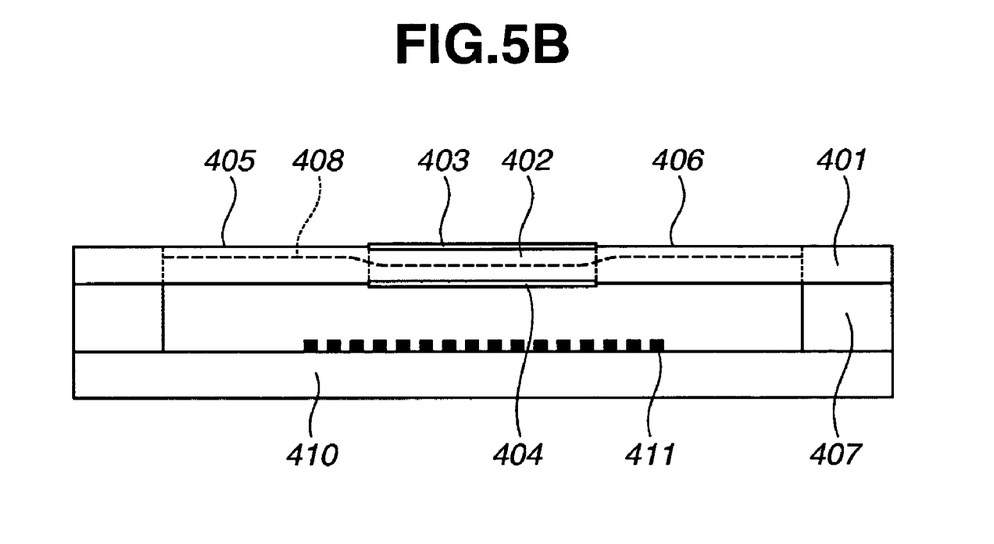
FIG. 5B is a cross-sectional view, taken along section 5B–5B' in FIG. 5A, illustrating the optical deflector of FIG. 5A.
Figure 6:
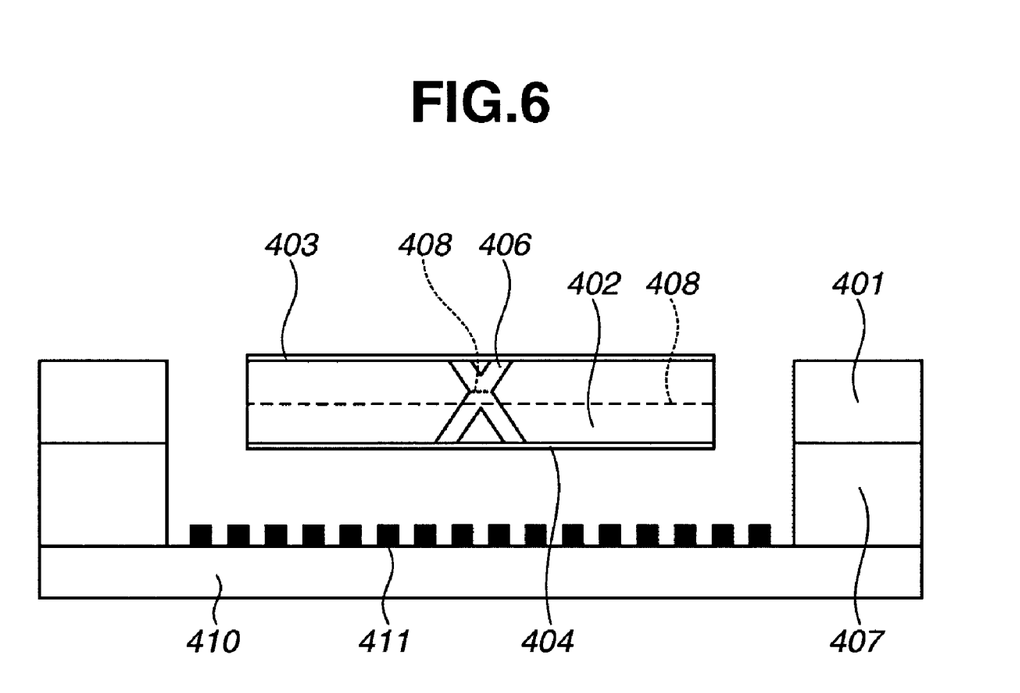
FIG. 6 is a cross-sectional view, taken along section 6–6' in FIG. 5A, illustrating the optical deflector of FIG. 5A.

A fourth embodiment of an optical deflector will be described with reference to FIGS. 5A and 5B and FIG. 6. This optical deflector has about the same structure as the optical deflectors of the first, second and third embodiments. The optical deflector of the fourth embodiment is different from those of the first, second and third embodiments in that a cross section of each of elastic support members 405 and 406 perpendicular to its longitudinal axis is made asymmetrical with respect to a neutral surface 408 to displace neutral surfaces 408 in the elastic support members 405 and 406 such that neutral surfaces 408 in a movable member 402 and the elastic support members 405 and 406 are not present in the same plane.

Further, a support substrate 401 is fixed to amounting structure 407 formed of a metal, such as aluminum, at a face of the support substrate 401 on a side of the neutral surface 408 in the movable member 402 opposite to a side of the neutral surface 408 of the elastic support members 405 and 406. In the fourth embodiment, the cross section of each of the elastic support members 406 and 406 has an X-shape as illustrated in FIG. 6. Alternatively, the cross section can have a V-shape, or the like.

When heat is applied to the optical deflector of the fourth embodiment, a tensile stress and a bending moment occur in the support substrate 401 which has a relatively-small thermal expansion coefficient and a relatively-large elastic coefficient. In the fourth embodiment, to cope with such phenomenon, the support substrate 401 is fixed to the mounting structure 407 as discussed above. It is accordingly possible to offset deformation of the movable member 402 due to the tensile stress by deformation of the movable member 402 due to the bending moment, and prevent reduction in a flatness of a reflective face 403. In FIGS. 5A and 5B and FIG. 6, reference numeral 404 designates a hard magnetic material similar to the hard magnetic material 104 in the first embodiment, reference numeral 410 designates a coil substrate, and reference numeral 411 designates a driving coil.

According to the construction of the above-discussed optical deflector of the fourth embodiment, it is also possible to achieve a flatness of the reflective face 403 in a range from 0° C. to 80° C. below 50 nm.

Description will now be given for an image forming apparatus (a projector) of a fifth embodiment using an optical deflector of the present invention, with reference to FIG. 7.

Figure 7:
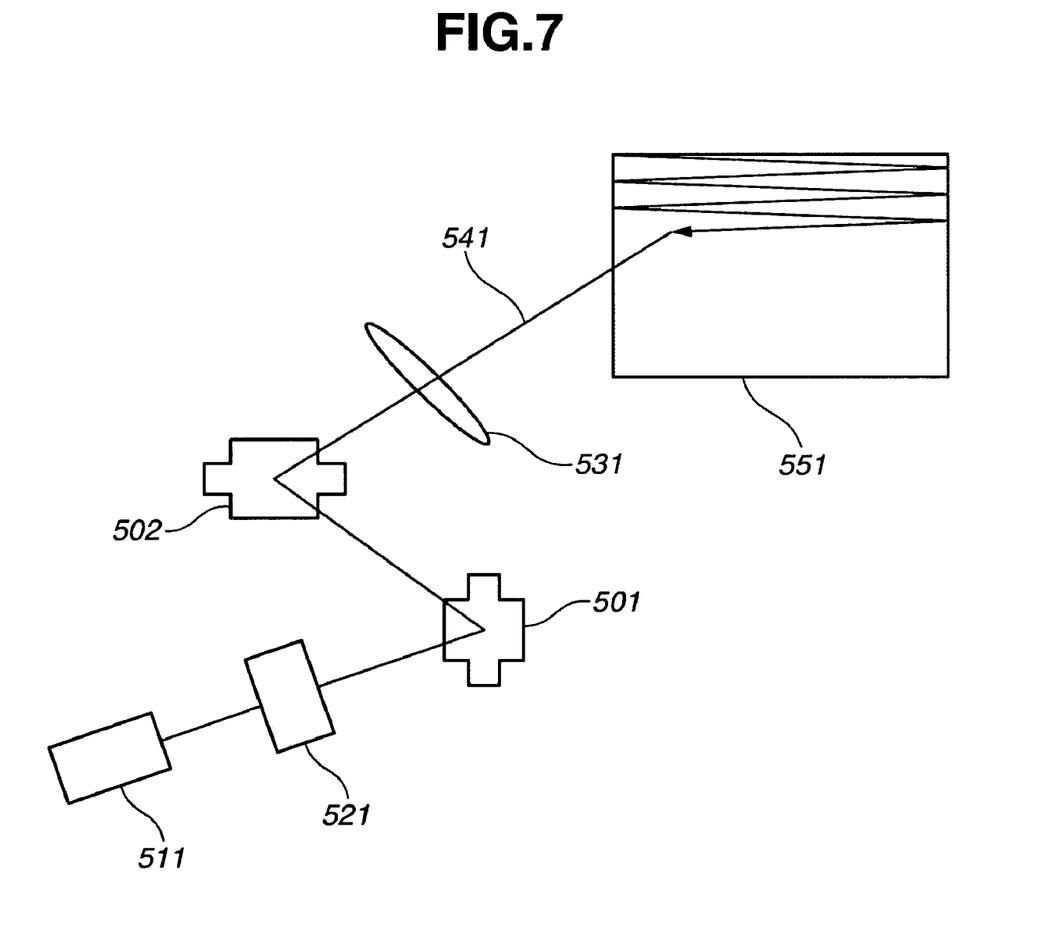
FIG. 7 is a view illustrating an image forming apparatus of a fifth embodiment according to the present invention.

In a structure illustrated in FIG. 7, optical deflectors 501 and 502 of the present invention are disposed such that their deflecting directions are perpendicular to each other. Accordingly, light incident on the optical deflectors 501 and 502 can be scanned in a two-dimensional manner, i.e., in both vertical and horizontal directions. Laser light 541 emerging from a laser light source 511 is intensity-modulated by an intensity modulating device 521, and is two-dimensionally scanned by the optical deflectors 501 and 502. The laser light source 511 can employ a red-color light source, a blue-color light source and a green-color light source, and red, blue, and green light from the three light sources can be mixed by a color-mixing optical system. The thus-scanned laser light 541 is transmitted through a lens 531, and an image of the light is formed on a projection surface 551.

In such an image forming apparatus, image quality on the projection surface is likely to decrease if a flatness of a reflective face of the optical deflector lowers (i.e., if the face is less flat). In the image forming apparatus of the fifth embodiment, optical deflectors of the present invention are used, so that reduction in a flatness of the reflective face can be prevented and degradation of the image quality can be avoided.

Description will now be given for an image forming apparatus of a sixth embodiment in which an optical deflector of the present invention is used and an electrostatic latent image is formed on a photosensitive member, with reference to FIG. 11.

Figure 11:
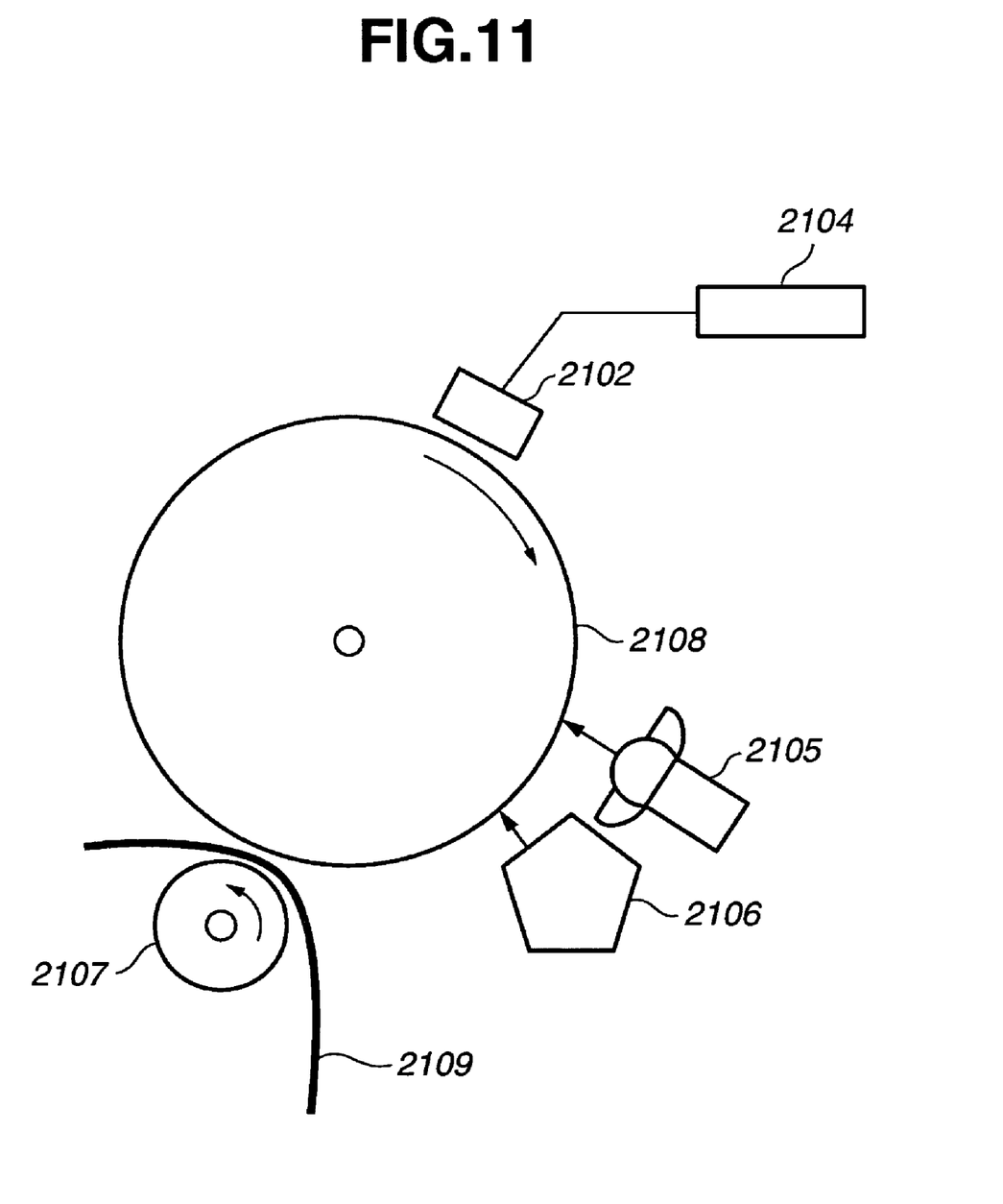
FIG. 11 is a view illustrating an image forming apparatus of a sixth embodiment according to the present invention.

FIG. 11 illustrates a detailed structure around the photosensitive drum of an electrophotographic developing apparatus using an optical deflector of the present invention. As illustrated in FIG. 11, an electrostatic charging device 2102, a light exposing device 2105 including a light source and an optical deflector of the present invention for one-dimensionally deflecting light from the light source in a direction perpendicular to the sheet of FIG. 11, and a toner supplying device 2106 are arranged around a photosensitive drum 2108. The electrostatic charging device 2102 electrifies a surface of the drum 2108, and a surface of the drum 2108 is exposed to light using the exposing device 2105 to form a latent image on the drum 2108. Toner is attached to the latent image by the toner supplying device 2106 to obtain a toner image. The toner image is then transferred to a transferring material 2109 sandwiched between a transferring material conveying roller 2107 and the photosensitive drum 2108, and the toner on the transferring material 2109 is fixed. Image formation is achieved by executing those process steps.

In the above-discussed structure, the electrostatic charging device 2102 is controlled by a high voltage generating device 2104. In the image forming apparatus of the sixth embodiment, an optical deflector of the present invention is used in the exposing device 2105, so that reduction in a flatness of the reflective face of the optical deflector can be prevented and degradation of the quality of the latent image on the drum 2108 can be avoided.

Except as otherwise disclosed herein, the various components shown in outline or in block form in the figures are individually well-known and their internal construction and operation are not critical either to the making or using of this invention or to a description of the beast mode of the invention.

While the present invention has been described with respect to what is presently considered to be the preferred embodiments and examples, it is to be understood that the invention is not limited to the disclosed embodiments and examples. The present invention is intended to cover various modifications and equivalent arrangements included within the spirit and the scope of the appended claims.

This application claims priority from Japanese Patent Application No. 2004-105838, filed Mar. 31, 2004, which is hereby incorporated by reference.

What is claimed is:

1. An optical deflector comprising:
   a support substrate, wherein a movable member of said optical deflector is swingingly supported by said support substrate through at least two elastic support members;
   a reflective face, said reflective face (a) being provided on said movable member, and (b) deflecting light incident thereon when said movable member is swung relatively to said support substrate; and
   a mounting structure for fixing said support substrate thereto,
   wherein a neutral surface of bending in a direction of a normal to said reflective face in said movable member is not present in the same plane as neutral surfaces of bending in a direction of a normal to said reflective face in said elastic support members, and
   wherein said support substrate is fixed to said mounting structure at a face of said support substrate on a side of the neutral surface in said movable member opposite to a side of the neutral surfaces in said elastic support members.

2. An optical deflector according to claim 1, wherein a convex portion is provided on a face of said movable member opposite to a face on which said reflective face is provided, and
   wherein said support substrate is fixed to said mounting structure at a face of said support substrate on a side opposite to a side of said reflective face.

3. An optical deflector according to claim 1, wherein a concave portion is provided on a face of said movable member opposite to a face on which said reflective face is provided, and said support substrate is fixed to said mounting structure at a face of said support substrate on a side of said reflective face.

4. An optical deflector according to claim 1, wherein for each elastic support member of said elastic support members, a cross section of said elastic support member perpendicular to a swinging central axis defined by said elastic support member has a shape which is asymmetrical with respect to the neutral surface of bending in the direction of the normal to said reflective face in said elastic support member.

5. An image forming apparatus comprising:
a light source; and
an optical deflector as recited in claim 1, said optical deflector deflecting light from said light source to form an image on a desired surface.

6. An optical deflector according to claim 1, wherein said movable member is integrally formed with said elastic support members.

7. An optical deflector according to claim 1, wherein said movable member is formed in said support substrate.

8. An optical deflector according to claim 1, wherein said elastic support members are formed in said support substrate.

9. An optical deflector according to claim 1, wherein said movable member and said elastic support members are formed in said support substrate.

10. An optical deflector according to claim 6, wherein said movable member and said elastic support members are formed in said support substrate.

11. An optical deflector comprising:
an elastic support member;
a movable member, said movable member being swingingly supported by said elastic support member;
a support substrate connected to said elastic support member; and
a mounting structure for fixing said support substrate thereto,
wherein said movable member is provided with a reflective face for deflecting light incident thereon when said movable member is swung, and
wherein a neutral surface in said elastic support member and a neutral surface in said movable member are not present in the same plane.

12. An optical deflector according to claim 11, wherein said support substrate is fixed to said mounting structure at a face of said support substrate on a side of the neutral surface in said movable member opposite to both of a side of the neutral surface in said elastic support member and a side of said reflective face.

13. An optical deflector according to claim 11, wherein at least one of a convex portion and a concave portion is provided on a face of said movable member opposite to a face on which said reflective face is provided.

14. An optical deflector according to claim 11, wherein a cross section of said elastic support member perpendicular to a swinging central axis defined by said elastic support member has a shape which is asymmetrical with respect to the neutral surface in said elastic support member.

15. An image forming apparatus comprising:
a light source; and
an optical deflector as recited in claim 11, said optical deflector deflecting light from said light source to form an image.

16. An image forming apparatus according to claim 15, wherein said image forming apparatus is constructed as a projector.

17. An image forming apparatus according to claim 15, wherein said image forming apparatus is constructed as an electrophotographic image forming apparatus in which an electrostatic latent image is formed on a photosensitive member.

18. An optical deflector comprising:
a movable member having a surface for deflecting light incident thereupon; and
an elastic support member for supporting said movable member,
wherein a plane defined by a location in a thickness direction of said movable member, the length of which plane in a longitudinal direction remains unchanged when said movable member is bent, is a different plane from a plane defined by a location in a thickness direction of said elastic support member, the length of which plane in a longitudinal direction remains unchanged when said elastic support member is bent.

19. An image forming apparatus comprising an optical deflector according to claim 18.

20. An image forming apparatus comprising a plurality of optical deflectors according to claim 18.

* * * * *

UNITED STATES PATENT AND TRADEMARK OFFICE
CERTIFICATE OF CORRECTION

PATENT NO. : 7,196,830 B2 Page 1 of 1
APPLICATION NO. : 11/091630
DATED : March 27, 2007
INVENTOR(S) : Kazutoshi Torashima et al.

It is certified that error appears in the above-identified patent and that said Letters Patent is hereby corrected as shown below:

COLUMN 10:
Line 25, "eigen frequency" should read --eigenfrequency--.
Line 66, "amounting" should read --a mounting--.

COLUMN 11:
Line 5, "members 406" should read --members 405--.

COLUMN 12:
Line 25, "beast" should read --best--.

Signed and Sealed this

Sixth Day of November, 2007

JON W. DUDAS
*Director of the United States Patent and Trademark Office*